No. 703,673. Patented July 1, 1902.
E. A. SPERRY.
ELECTRIC BATTERY AND MOUNTING SAME.
(Application filed Sept. 13, 1899.)
(No Model.)
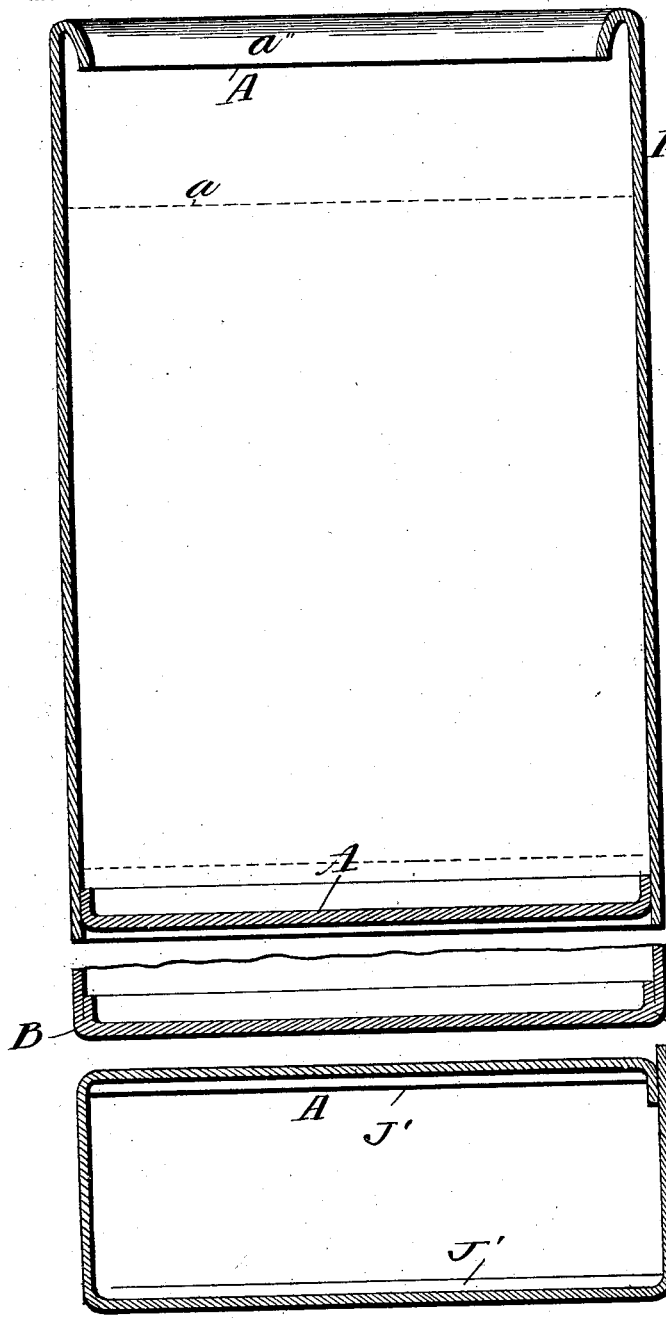
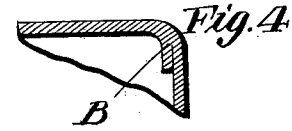
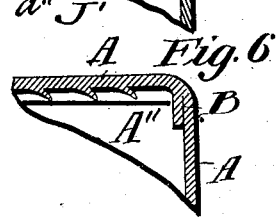
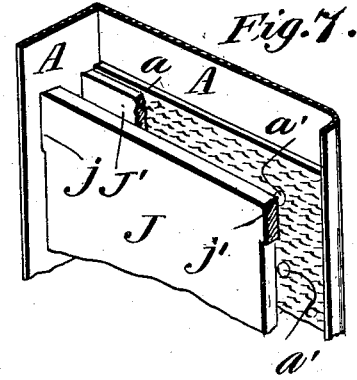
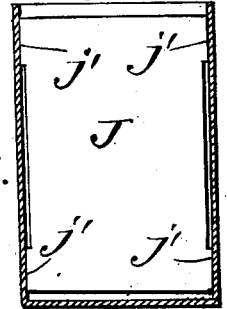
Witnesses
L. C. Hills
W. R. Taylor
Inventor:
Elmer A. Sperry

UNITED STATES PATENT OFFICE.

ELMER A. SPERRY, OF CLEVELAND, OHIO, ASSIGNOR, BY MESNE ASSIGNMENTS, TO NATIONAL BATTERY COMPANY, A CORPORATION OF NEW JERSEY.

ELECTRIC BATTERY AND MOUNTING SAME.

SPECIFICATION forming part of Letters Patent No. 703,673, dated July 1, 1902.

Application filed September 13, 1899. Serial No. 730,320. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Electric Batteries and Mounting Same, of which the following is a specification.

This invention relates to storage-battery construction and mounting; and the invention consists in the new and novel features of construction and combination of parts hereinafter set forth and claimed.

In the accompanying drawings, Figure 1 illustrates a vertical section of the jar or receptacle of the battery. Fig. 2 is a detail of same further along in the process of manufacture. Fig. 3 is a plan of the jar in one process of its construction, and Fig. 4 is a corner of same after being burned. Figs. 5 and 6 are details. Fig. 7 illustrates one of the sheets forming the case or a part thereof with elements attached, with the upper portion and lip removed. Fig. 8 shows one form of the plate in side elevation, together with a section of the battery vessel.

Similar letters of reference indicate like parts throughout.

As illustrated in the drawings, the battery-receptacle A consists of a long narrow rectangular case, which may be constructed from sheet-lead by folding the same as indicated in Fig. 3, joining together and sealing the ends of the metal which may meet in one of the edges of the case, and closing up one of the ends of the hollow box thus formed by inserting therein another piece of metal A', which forms the bottom of the battery-receptacle. The piece A', which is preferably bent to provide a flanged portion around its perimeter, is inserted far enough to allow the sides of the case to project somewhat and then sealed to the case in any desired manner. The sealing of the edges of the case and of the bottom may be nicely and easily accomplished by lead-burning the same; but, if preferable, solder may be employed for this purpose. By allowing the sides of the case to project slightly beyond the bottom sufficient material is furnished to accomplish the sealing by lead-burning and also a corner to catch and hold a portion of the lead as it is burned or hold the solder in case this method is employed. In this way the edges around the bottom and one or more corners are stiffened by solid masses or added thickness of the material resulting from the burning. This lead cup used as a case for a storage battery is preferable to other materials—such, for instance, as hard rubber—owing to the extreme brittleness and also the expense of the latter, and, furthermore, it being an excellent conductor may easily be employed as a part of the conducting system. Its use in this connection is contemplated in the present invention and will not be described.

The plates J, which are located immediately within the cell, are secured to the walls of the case, as shown in Figs. 7 and 8. This is done, preferably, by lead-burning at or near the upper corner and may be followed down along the side as far as is necessary for the proper stability and electrical conductivity, leaving, however, an opening or communicating space between the electrode and the case for the circulation of the electrolyte. Positive plates or electrodes may be inserted between the negative electrodes and secured to the case by suitable insulation or supported in any well-known manner. It will thus be seen that the side of the plate A which constitutes the cell at the same time constitutes one part of the negative element of the battery. For the purpose of securing the active material J' to the surface A this surface may be roughened or provided with projections, as is shown in Fig. 6 at A", or a separate roughened and perforated sheet $a$ may be fastened thereto by rivets $a'$ or otherwise, as shown in Figs. 5 and 7. Here the tongues $a''$, seen protruding from the sheet $a'$, are produced by piercing the sheet from the back side, driving out the protruding tongues, and leaving perforations $a^3$ $a^3$. Thus the active material J' always lies in contact with the wall of the cell and is supported thereon by the protrusions or tongues, together with the perforations. These constitute the so-called "roughnesses" of the added plate $a'$. Fig. 7 also illustrates one of the sheets A of which the battery is constructed before being burned into a rectangular tube and at which time free access is gained for thoroughly joining the plate J to the wall A at a point $j$. The opposite end or corner $j'$ may be burned to the opposite wall after assembling, as heretofore described. A portion only of the wall $a$ is shown roughened. This will illustrate the principle of construction involved.

It will readily be seen from several of the figures that the upper edges of the electrodes are well down from the top of the case. This feature is valuable on account of eliminating the necessity of a cover, as the slopping of the electrolyte is not sufficient to cause trouble if the walls of the cell are high enough above the surface.

The downwardly-projecting overhanging lip $a^4$ around the cell at or near its upper edge is above the electrodes, with a free space closed at the top between the lip and the case. This is fully shown in Fig. 1 and is for the purpose of preventing the slopping of electrolyte. This means has great advantages when the cells are used on moving vehicles or when such cells are transported. Considering this overhanging lip, it will be readily seen that a flexible metal, such as sheet-lead, may be advantageously employed, as with a degree of flexibility present in this lip it may be sufficiently bent to enable easy access to the electrodes, which is especially desirable in connection with removing and inserting same.

In a storage battery provided with a lead case, and especially when such case is utilized as a part of the electrical circuit, to be commercial the case must be as thin and light as possible. I have found that by fusing or otherwise attaching the electrodes at a number of points to the case two valuable objects are accomplished—the thin case is supported and strengthened by the electrodes, which act as partitions, and in drawing off the current, especially when heavy currents are required to be conducted, the plurality of contacts affords distribution, thus cutting down the current at any one point below the danger limit of overheating and warping or otherwise affecting the walls of the case.

Wherever "lead" is referred to in this specification, it should be understood that I would not limit myself to the use of pure lead; but, as is usual, it is and may be alloyed with more or less foreign substances and metals. These mixtures may be accidental or mixed for stiffening or increasing the life of the cell or for any other purpose.

It will be readily understood that while the detailed construction has been described with more or less minuteness, yet the invention should in no wise be restricted to the exact methods and details described, but rather should be limited only in scope as indicated in the claims. It will furthermore be readily understood that while it is designed to use the above parts in the relation shown, yet some may be used without the others, and the invention extends to such use.

I claim as my invention—

1. In a receptacle for a battery, free electrolyte within the receptacle, the walls of the case extending above the electrolyte and being provided with an inwardly and downwardly overhanging lip at or near the upper edge of the case with a free space between the lip and the wall.

2. A metallic case for a battery, forming part of an electric circuit, active material forming the negative electrode applied directly to the wall of the case, and an electrolyte within the case, in combination with an electrode, or electrodes, introduced into such case and made integral therewith at a plurality of points on the perimeter of the electrode or electrodes for affording better electrical distribution as between the electrode and the case.

3. A case for a battery, having sides consisting of a bent metallic conducting-plate, having a face supplied with active material placed in contact therewith, in combination with an additional plate attached to the active walls for better support of such material, the edges of the bent plate being joined to form a case for the electrolyte.

4. A case for a battery, having sides consisting of a bent metallic conducting-plate, having a face supplied with active material placed in contact therewith, in combination with a perforated plate attached to the active walls for better support of such material, the edges of the bent plate being joined to form a case for the electrolyte.

5. A case for a battery, having sides consisting of a bent metallic conducting-plate, having a face supplied with active material placed in contact therewith, in combination with an additional plate supplied with perforations and projections attached to the active walls for better support of such material, the edges of the bent plate being joined to form a case for the electrolyte.

6. A case for a battery, having sides consisting of a bent metallic conducting-plate, having a plurality of faces, supplied with active material placed in contact therewith, in combination with an additional plate or plates attached to the active walls for better support of such material, the edges of the bent plate being joined to form a case for the electrolyte.

7. In a receptacle for a battery, a case for containing the electrolyte, an electrode within the case, the walls of the case extending above the electrode, and an inwardly and downwardly overhanging lip at or near the upper edge of the case with a free space between the lip and the wall.

8. A case for a battery having sides consisting of a bent metallic conducting-plate with active material placed in contact therewith, in combination with an additional electrode or electrodes attached to the bent plate, a welded joint between the bent plate and the electrodes, the same being applied along the edge of the electrode at the junction with the plate, the bent plate being joined at its edges to form the sides of the case for the electrolyte.

9. A thin metallic case for a battery, forming in part the negative electrode, containing electrolyte, in combination with an electrode or electrodes within such case and made integral therewith at a plurality of points for affording added support to the thin walls.

10. In a receptacle for a battery, a case for containing the electrolyte, electrodes within the case the walls of which extend above the electrodes, and an inwardly-projecting overhanging lip of flexible material at or near the upper edge of the case with a free space between the lip and the wall.

11. In a receptacle for a battery, a lead case for retaining the electrolyte, electrodes within the case, the walls of which extend above the top of the electrodes, and an inwardly-projecting overhanging lip of sheet-lead at or near the upper edge of the case with a free space between the lip and the wall.

12. A thin metallic case for a battery, containing an electrolyte, in combination with an electrode or electrodes, introduced into such case and fused into electric contact therewith at several points, but at less than the entire perimeter of three edges of the electrodes to leave communicating space from side to side of such electrodes, the electrode thus performing the function of a supporting-partition.

ELMER A. SPERRY.

Witnesses:
W. S. ROGERS,
M. C. PRENDERGAST.